United States Patent [19]

Bluhm et al.

[11] 4,081,890

[45] Apr. 4, 1978

[54] METHOD OF FORMING AN INJECTOR VALVE NUT SEAL

[75] Inventors: Elmer Bluhm, Grandville; Frederick T. Vaas, Jr., Grand Rapids, both of Mich.

[73] Assignee: General Motors Corporation, Detroit, Mich.

[21] Appl. No.: 688,693

[22] Filed: May 21, 1976

[51] Int. Cl.[2] .......... B23P 15/00

[52] U.S. Cl. .......... 29/157 C; 277/170; 285/332.3; 239/584

[58] Field of Search .......... 29/156.7 R, 156.7 A, 29/157 C, 445; 277/170, 168, 169, 171, 172; 239/584, 90; 285/332.3

[56] References Cited

U.S. PATENT DOCUMENTS

| | | | |
|---|---|---|---|
| Re. 19,184 | 5/1934 | Junkers | 239/584 |
| 1,930,003 | 10/1933 | Erny | 277/170 |
| 2,003,813 | 6/1935 | Taylor | 239/584 |
| 2,090,232 | 8/1937 | Ritz | 239/584 |
| 2,250,355 | 7/1941 | Bruck | 285/332.3 |
| 2,459,286 | 1/1949 | Rabezzana et al. | 285/332.3 |
| 2,632,431 | 3/1953 | Suter | 277/169 |
| 3,166,345 | 1/1965 | Pinkard | 285/332.3 |
| 3,263,025 | 7/1966 | Wheeler | 277/171 |
| 3,275,348 | 9/1966 | Scott | 285/332.3 |

*Primary Examiner*—Lowell A. Larson
*Assistant Examiner*—Daniel C. Crane
*Attorney, Agent, or Firm*—Arthur N. Krein

[57] ABSTRACT

A method of forming an injector valve nut seal between the spray tip body and the sleeve type valve nut of, for example, a unit fuel injector, the method including the steps of fabricating an annular ring of a predetermined area in cross-section and of a suitable deformable material, positioning the seal ring to encircle the straight cylindrical portion on the lower end of the spray tip body prior to inserting this lower end of the spray tip body through the open lower end of the valve nut, securing the valve nut onto the threaded end of the body of the injector whereby as this occurs, the ring seal will be caused to move up to and be shaped to conform around the intermediate conical portion of the spray tip body and conform to the conical inner peripheral surface at the lower end of the valve nut so that the annular ring seal thus formed in place is in press fit engagement with both the outer peripheral surface of the intermediate conical portion of the spray tip body and the conical inner peripheral surface of the valve nut.

1 Claim, 3 Drawing Figures

METHOD OF FORMING AN INJECTOR VALVE NUT SEAL

Figure 1:
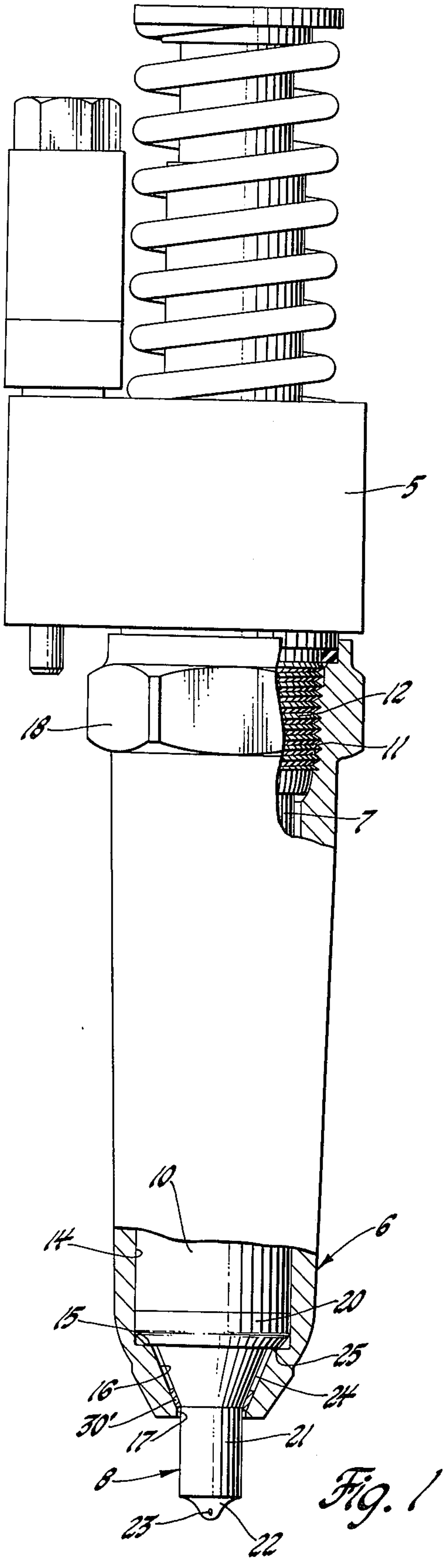

This invention relates to a seal for a unit fuel injector or an injector nozzle of the type used to inject fuel into the cylinders of an internal combustion engine and, in particular, to a method of forming an injector valve nut seal in such an assembly.

As is well known, internal combustion engines, including diesel engines, are operated under widely different conditions. Some of these different conditions which can accelerate failures in engines operating under various loads and speeds are high humidity environments and the use of high sulfur fuels in the engines. These accelerated failures are often characterized by a corrosion attack of the metals in the various components of the engine which can result because of carbon deposits on these elements. For example, in some areas of the engine component parts, there are clearances between various elements of such components which eventually build up with carbon deposits. These carbon deposits absorb and hold sulfur compounds from the fuel and, if moisture from the air is available, it can form sulfuric acid. The metal from which the component parts are manufactured can then be attacked when the acid is held in contact with the surface of the metal parts.

Many types of commercial fuel injectors used in diesel engines have clearances at the ends thereof that protrude into the combustion chamber of an engine. These clearances are the result of tolerance stack-up between the various elements of an injector and, therefore, cannot be eliminated because of the conventional procedures used to assemble these fuel injectors. In the prior art, these clearances were not normally sealed to eliminate possible carbon deposits. As a result, the normal build-up on these injectors of carbon deposits which hold acids eventually result in premature failures when the corrosion attack destroys the valve nut to spray tip seal and allows combustion gases to enter the fuel injector. This type of failure is then detected by a loss of power and excessive exhaust smoke.

It is therefore a primary object of this invention to provide a method of forming an injector valve nut seal whereby a seal is formed within the fuel injector during assembly thereof, the seal being provided at the end of the injector assembly that protrudes into the combustion chamber of an engine.

Another object of this invention is to provide a method of forming an injector valve nut seal in a fuel injector assembly, the seal being used to prevent the formation of carbon deposits between the valve nut and spray tip body of the fuel injector so as to prevent the premature failure of the fuel injector as a result of corrosion caused by carbon deposits.

These and other objects of the invention are obtained by means of an injector valve nut seal formed by a method which includes the steps of fabricating a ring of suitable ductile material, the seal ring being, for example, of rectangular configuration in cross section and of a predetermined area in cross-section, placing the ring to encircle the straight cylindrical portion at the lower end of the spray tip body of an injector assembly prior to assembly of the spray tip body to the remaining components of the injector assembly, whereby during assembly of the fuel injector, the spray tip body is positioned to extend through the open lower end of the valve nut forming part of the fuel injector assembly, the valve nut then being secured to the housing of the fuel injector and tightened thereon in the normal manner. During this latter assembly procedure, the ring will move up to and conform around the intermediate conical portion on the spray tip body and will conform to abut against the conical inner peripheral surface at the lower end of the valve nut whereby a ring seal is formed.

Figure 2:
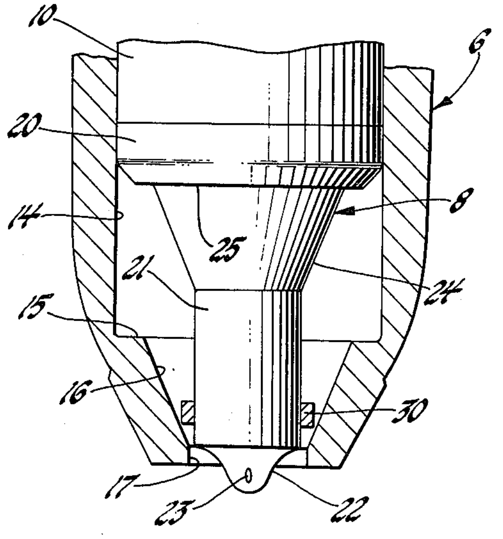
Figure 3:
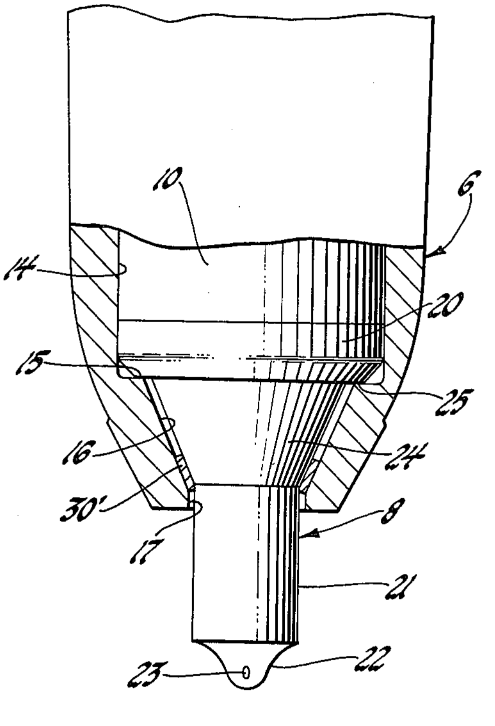

For a better understanding of the invention, as well as other objects and further features thereof, reference is had to the following detailed description of the invention to be read in connection with the accompanying drawings, wherein:

FIG. 1 is a elevational view of an otherwise conventional unit fuel injector assembly having an injector valve nut seal formed in accordance with the methods of the invention incorporated therein, parts of the fuel injector assembly being broken away to show details of its construction;

FIG. 2 is an enlarged, exploded view of the spray tip body and valve nut and seal ring of the unit fuel injector assembly of FIG. 1 shown in their respective positions during the assembly of a unit fuel injector, with the seal ring shown in its original configuration; and, FIG. 3 is an enlarged view, with parts broken away, of the lower or spray tip end of the unit injector shown in FIG. 1 with the injector valve nut seal shown in its final, as assembled, configuration.

Referring first to FIG. 1, there is illustrated a conventional unit fuel injector which may be of the type as disclosed, for example, in U.S. Pat. No. 3,075,707 issued to Thomas E. Rademaker and which includes a housing 5 in which a plunger, not shown, is reciprocably received. Forming an extension of and threaded to the lower end of the housing is a sleeve type valve nut 6 within which is supported a bushing 7 which forms a pumping cylinder for the plunger, the bushing 7 being positioned in abutment against the lower planar surface of the housing. Clamped to the lower end of the bushing 7 by the valve nut 6 is a fuel injector nozzle assembly which includes as a part thereof at least a nozzle or spray tip body, hereinafter referred to as the spray tip body generally indicated by reference numeral 8, and a cylindrical element means which normally includes a spacer block — spring retainer member means 10 that may be formed as one or more separate elements. As is conventional, the spacer block — spring retainer member means 10 would be sandwiched between the lower end of the bushing 7 and the upper end of the spray tip body 8. However, although it is to be realized that, for ease in manufacturing, the spray tip body 8 is normally formed as a separate unit, it may be formed, for example, integrally with at least one element of the spacer block — spring retainer member means 10.

The valve nut 6, in the construction illustrated, is provided with a through bore providing an internal first cylindrical wall portion provided with internal threads 11 for engagement with the external threads 12 formed on the lower portion of the housing 5, an internal second cylindrical wall portion 14 to receive the bushing 7, spacer block — spring retainer member means 10 and the upper enlarged end of the spray tip body 8, an annular shoulder 15 extending radially inward from the second cylindrical wall 14 to an annular internal frusto-conical wall 16 which in turn connects to an internal cylindrical wall 17 of reduced inside diameter extending to the bottom surface of the valve nut, the frusto-conical wall 16 and cylindrical wall 17 forming an opening through the lower end of the valve nut 6. In addition, the valve nut 6 is provided with a suitable external wrenching head 18, such as the hex head shown, whereby the valve nut 6 can be torqued onto the housing 5 during assembly of the unit injector.

The spray tip body 8, in the construction illustrated, is conventional and could, for example, be of the type disclosed in the above identified U.S. Pat. No. 3,075,707, and it includes an upper enlarged cylindrical body portion 20 and a lower straight cylindrical body portion 21 of reduced diameter relative to the body portion 20 which terminates at a spray tip 22 having one or more orifice openings 23 therethrough the upper body portion 20 and the lower cylindrical body portion 21 being interconnected by an intermediate body portion 24 of frusto-conical configuration similar to that of frusto-conical wall 16 of the valve nut 6. The enlarged upper body portion 20 forms with the intermediate body portion 24 an annular shoulder 25 which seats on the radial shoulder 15 of that valve nut 6 as when the valve nut is fully secured to the housing 5.

Because of the high fuel pressure encountered within the unit injector, it is necessary that the axial extent of the bore in the valve nut 6 to the shoulder 15 therein be properly sized relative to the axial or longitudinal extent of the bushing 7, spacer block — spring retainer member means 10 and the upper body portion 20 of the spray tip body 8 so that the valve nut 6 can be properly torqued down on the threads 12 of the housing whereby the above described elements can be axially forced into sealed abutment against each other with the shoulder 15 of the valve nut in sealed abutment against the shoulder 25 of the spray tip body 8 during assembly of the unit fuel injector.

To effect this, the inside diameter of the internal cylindrical wall 17 of the valve nut 6 must be sized so as to slidably receive the lower cylindrical body portion 21 of the spray tip body 8 therethrough and, of course the axial extent of the intermediate body portion 24 of the spray tip body, the included angle of this intermediate body portion of frusto-conical configuration and the maximum and minimum outside diameters at opposite ends thereof relative to the axial extent, included angle and maximum and minimum inside diameters of the frusto-conical wall 16 of the valve nut should be such that at least some predetermined minimum clearance exists therebetween in the above described final assembled position of the valve nut to the housing whereby the spray tip body 8 does not hang up in the valve nut 6 to prevent formation of the above described sealing engagement between the various elements of the assembled unit fuel injector.

However, in the mass production of such unit injectors, due to stack-up tolerances between the various elements of such an injector, the actual clearance that exists between the valve nut 6 and the intermediate body portion 24 and cylindrical body portion 21 of the spray tip body 8 normally exceeds such a predetermined minimum clearance. Since it is the spray tip body end of the unit fuel injector which protrudes into or is in direct communication with the combustion chamber of an engine, it is in this clearance space between the lower end of the valve nut and the spray tip body that carbon deposits can build up and this carbon deposit can then absorb and hold sulfur compounds from the fuel. If moisture from the air is available, sulfuric acid can then form which would then cause corrosion at the interface between the shoulder 15 of the valve nut and the shoulder 25 of the spray tip body to, in effect, destroy this valve nut to spray tip seal.

Now in accordance with the subject invention, there is provided a method of forming a ring seal between the lower internal end of the valve nut 6 and the exterior of the spray tip body 8 that is operable to prevent the formation of carbon deposits within this end of the unit fuel injector. In accordance with the method of the invention, this ring seal is fabricated in place in a manner to be described.

To effect this fabrication of the ring seal, the ring seal is originally formed from, for example, a suitable ductile metallic material, such as copper, which is substantially softer than the material of the valve nut 6 or the spray tip body 8 to be sealed thereby. In its original configuration, the ring seal in the construction shown, is an annular ring 30 of rectangular configuration in cross-section and with an inside diameter of a predetermined size whereby this ring 30, in its original configuration can slidably receive the lower straight cylindrical portion 21 of the spray nut body therethrough. The outside diameter of the ring 30 is substantially greater than the minimum inside diameter of the frusto-conical wall 16 of the valve nut 6. In addition, the width of the ring 30, relative to its inside diameter and outside diameter, is such as to provide sufficient material for the formation of an adequate size seal ring 30' of a formed in place configuration whereby to provide an effective seal that is in abutment on one side with the frusto-conical wall 16 of the valve nut 6 and on its other side in abutment at least against the frusto-conical surface of the intermediate wall portion 24 of the spray tip body 8 and, preferably, also in abutment against at least the upper portion of the lower straight cylindrical body portion 21 of this spray tip body.

The ring 30, in its original configuration, can be fabricated as by stamping from a flat piece of metal or it can be fabricated from suitably dimensioned wire. Preferably, after the original fabrication of the ring 30, that is, when the ring 30 is in its as fabricated form, it is annealed so as to relieve any stresses in the material of the ring that may have developed during the original fabrication thereof.

During assembly of the unit injector, the ring 30 is first positioned to encircle the lower straight cylindrical portion 21 of the spray tip body 8, the position shown in FIG. 2, after which this spray tip body and other elements associated therewith are assembled to the valve nut 6 with the straight cylindrical body portion 21 of the spray tip body then extending through the lower opening of the valve nut 6. As the lower straight cylindrical body portion 21 of the spray tip body 8 is caused to move in an axial direction relative to the valve nut 6 so as to be positioned to extend through the opening at the lower end of the valve nut, the ring 30 first engages the frusto-conical wall 16 of the valve nut 6 so that the ring 30 is then caused to ride up on the body portion 21 of the spray tip body until it initially abuts against the exterior surface of the intermediate body portion 24 of the spray tip body.

Then the valve nut 6 is threaded onto the housing 5 and turned down relative thereto to effect a tightening together of these elements. As this tightening operation continues, the ring 30 will then be moved to start riding up in engagement with the intermediate body portion 24 of the spray tip body and thus will be forced between the exterior frusto-conical surface of the intermediate body portion 24 and the inner frusto-conical surface 16 of the valve nut to deform, in a somewhat plastic manner, to these surfaces in conformity therewith and filling any clearance space therebetween. This deformation of the ring 30 will continue until the valve nut 6 is torqued to its fully assembled position onto the housing 5, with the bushing 7, spacer block — spring retainer means 10 and the upper end body portion 20 of the spray tip body then in sandwiched relation between the lower end of the housing 5 and the shoulder 15 of the valve nut. In its final configuration, the ring 30 will then have been transformed into the shape, as shown in FIGS. 1 and 3, of a ring seal 30' which is of annular conical configuration having one side thereof in sealing abutment against the exterior frusto-conical surface of the intermediate body portion 24 of the spray tip body and its other side in sealing abutment against the inner frusto-conical surface 16 of the valve nut thereby providing a seal next adjacent to the lower open end of the valve nut 6 between this valve nut and the spray tip body so that carbon deposits cannot build up in the clearance space between these elements.

After the ring seal 30' has been formed in place, if the unit fuel injector is then disassembled, as for servicing thereof, it is then preferred that the ring seal 30' of this assembly be discarded and a new ring 30 assembled to the spray tip body prior to the reassembly of the unit fuel injector so that a new ring seal 30' will be formed, in the manner described, as part of this reassembly since the stack-up tolerances in this reassembly may vary from that of the original assembly.

Although the ring 30 used to form the ring seal 30' in the construction illustrated was formed of a suitable ductile material so as to have a rectangular shape when viewed in cross-section, it is to be realized that such a ring, in its original configuration, can be of any suitable configuration when viewed in cross-section, it only being necessary that sufficient material be available in the body of this ring so that it can be deformed during assembly of the unit fuel injector so as to provide a seal between the valve nut 6 and the spray tip body 8 regardless of the stack-up clearance between these elements.

WHAT IS CLAIMED IS:

1. A method of forming in place a ring seal in the clearance space between the outer peripheral conical surface of an injector spray tip body and the inner peripheral conical surface of a sleeve type valve nut in a unit fuel injector, said method including the steps of forming an annular substantially flat ring of rectangular cross-section and of ductile material which, when viewed in cross-section, is of a predetermined shape and size so as to provide sufficient material to fill any clearance space that exists between the injector spray tip body and the interior surface of the sleeve valve nut after they are in assembled position relative to each other, positioning said ring to slidably encircle the lower portion of the spray tip body prior to the assembly of the spray tip body with the valve nut, inserting the lower end of the spray tip body with said ring thereon through the lower open end of the valve nut and then effecting axial displacement of the valve nut relative to the spray tip body thereby causing said rectangular ring to move and to become formed in place around the outer peripheral conical surface of the spray tip body and to the inner peripheral conical surface in the valve nut so as to form a conical ring seal in the clearance space therebetween with one surface of the ring seal in sealing abutment against the outer peripheral conical surface of the spray tip body and at its other side in sealing abutment against the inner peripheral surface of the valve nut and forming an upper seal by contacting surfaces on said spray tip body and said valve nut, said conical ring seal preventing corrosive materials from being transmitted to said upper seal.

* * * * *